Aug. 16, 1932.　　　H. L. COLE ET AL　　　1,872,247
WINDING FOR ELECTRICAL APPARATUS
Filed Dec. 20, 1929　　　2 Sheets-Sheet 1
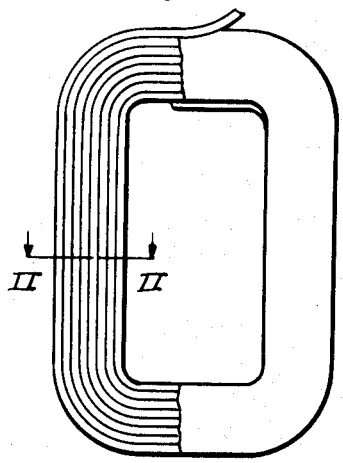
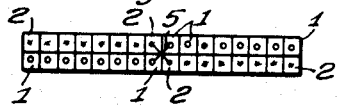
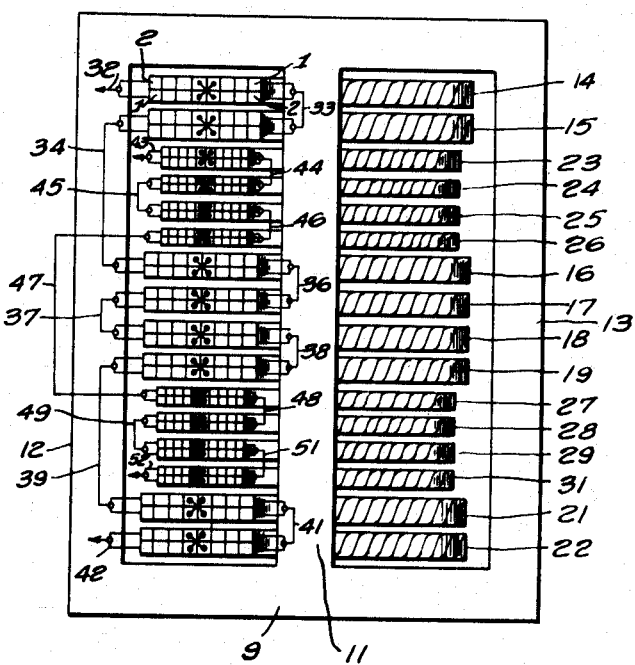
INVENTORS.
Horace L. Cole,
Walter M. Dann and
Roy L. Brown.
BY
ATTORNEY INVENTORS.
Horace L. Cole,
Walter M. Donn and
Roy L. Brown.
BY
ATTORNEY Patented Aug. 16, 1932

1,872,247

UNITED STATES PATENT OFFICE

HORACE L. COLE, WALTER M. DANN AND ROY L. BROWN, OF SHARON, PENNSYLVANIA, ASSIGNORS TO WESTINGHOUSE ELECTRIC AND MANUFACTURING COMPANY, A CORPORATION OF PENNSYLVANIA

WINDING FOR ELECTRICAL APPARATUS

Application filed December 20, 1929. Serial No. 415,485.

Our invention relates to windings for electrical inductive apparatus and more particularly to an arrangement of conductors in the windings of such apparatus.

The eddy-current losses in a copper conductor of inductive apparatus, such as a transformer winding, vary approximately with the square of the dimension of the conductor at right angles to the direction of the leakage flux, which, in the case of the interleaved type of winding, is approximately at right angles to the axis of the winding or in the plane of the winding coils. It is, therefore, advantageous, in order to limit the electrical losses in the windings, to keep this dimension as small as possible.

It is also desirable to form coils of the flat-disc or pancake type of such thickness, corresponding substantially to the width of conductor, that they will be strong enough mechanically to withstand handling, without injury, during winding and assembly of the transformer. If such coil is formed from a single conductor having a width that is substantially the thickness of the coil, and that is sufficient to obtain the necessary mechanical strength, it may be so large as to result in comparatively high stray losses and comparatively high eddy-current losses within the conductor.

It is possible to materially reduce the eddy-current losses by the use of two or more conductor elements side by side without using more copper material. Such conducting strands or sub-divided conductor elements may be individually wrapped, for example, with paper insulation, the several strands or subdivided elements being then wrapped or taped together to form a single conductor structure from which the coil may be wound. Since the two conductor strands are solidly taped together, they can be handled as a single conductor, the subdivided elements being transposed at the middle of the coil in order to avoid unequal currents resulting from stray flux passing in the direction of the plane of the coil. The winding may be so connected as to avoid the necessity of transposing at the middle turn of each coil, the transposition being made either between adjacent coils or between groups of coils.

An object of our invention is to increase the efficiency of stationary inductive apparatus, such as transformers, by reducing the eddy-current losses in the copper while permitting an economical design of a winding that is mechanically strong.

Our invention will be better understood by reference to the accompanying drawings, in which, Figure 1 is a plan view of a coil of the pancake type in which our invention may be utilized.

Fig. 2 is a cross-sectional view, taken on the line II—II of Fig. 1, showing one arrangement of the subdivided conductors within the coil;

Fig. 3 is a cross-sectional view of a coil showing a different arrangement of the subdivided conductors within the coil;

Fig. 4 is a vertical sectional view of the core and windings of a transformer, showing the connections of the subdivided conductors and the transpositions thereof within the coils;

Figure 5:
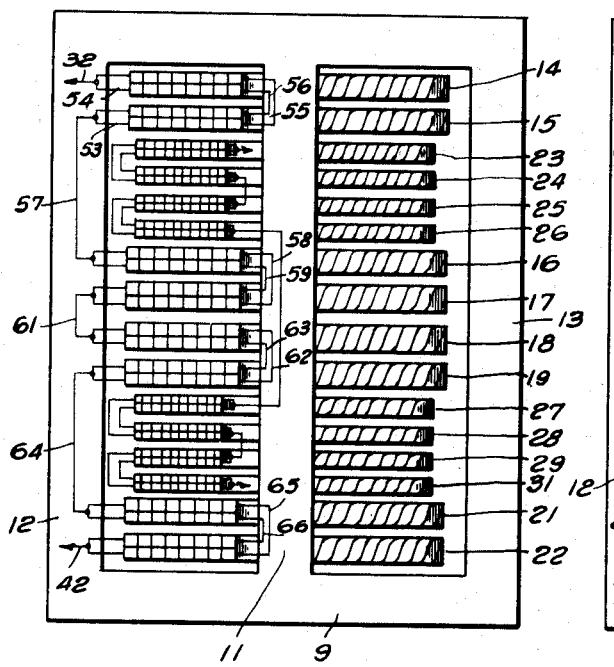
Figure 6:
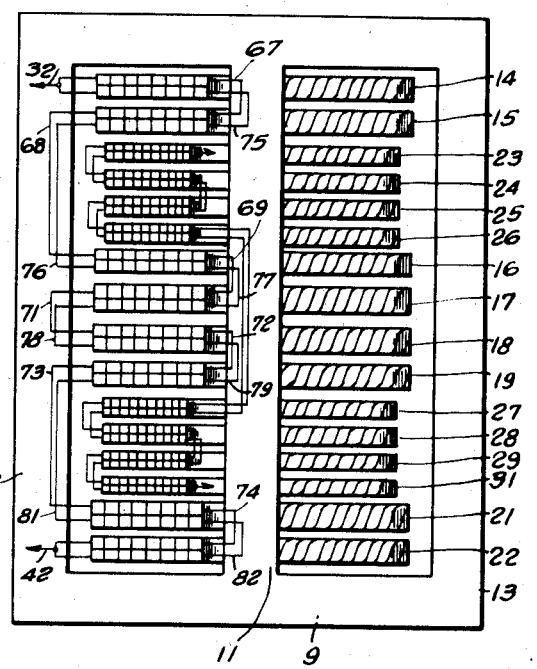

Figs. 5 and 6 are vertical sectional views of the core and windings of transformers showing different ways of connecting the coils to effect uniform distribution of current in the subdivided conductors without the necessity of transposing them within the coils, and Figs. 7 to 11, inclusive, are cross-sectional views illustrating various arrangements of the subdivided conductors and insulation which go to make up the main conductor ribbon from which the winding is formed.

Figure 7:
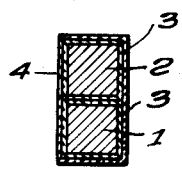

Referring to Fig. 7 of the drawings, a conductor is illustrated as comprising two subdivided conducting elements or strands 1 and 2, each of which is separately wrapped or taped with insulation 3 and the two elements thereafter are taped together with insulation 4, thus forming, in effect, a single conductor which is formed into a coil of the character shown in Fig. 2. The separate strands 1 and 2 are subdivided, transversely to the axis of the winding of the coil, by means of the insulation 3 between them and are transposed, as shown at 5 in Fig. 2, in the middle of the coil, the strand or element 2 being above the element 1 for approximately one half the length of the coil winding and in the reverse position for the remaining portion of the coil winding.

Referring to Fig. 4 of the drawings, a core member 9 is illustrated having two windows defined by the middle or winding leg 11 and the two outside legs 12 and 13. A low-voltage winding is shown, comprising the coils 14, 15, 16, 17, 18, 19, 21 and 22, and a high-voltage winding is shown, comprising the coils 23, 24, 25, 26, 27, 28, 29 and 31. These two windings are similar, in general, to that shown in Figs. 1 and 2 in which two parallel strands or subdivided conductor elements are used and transposed at substantially the center or middle turn of each coil of the winding. The circuit through the low-voltage winding may be traced from the terminal 32 through the subdivided elements 1 and 2 which are connected in parallel-circuit relation at each end of the coil, through the common connector 33, and similarly, in parallel circuit through the coil 15, by conductor 34, through the coil 16, conductor 36, coil 17, conductor 37, coil 18, conductor 38, coil 19, conductor 39, coil 21, conductor 41, coil 22 to the terminal 42, the conductors of each coil being connected in parallel circuit at the ends of the coil and transposed at the middle turn of the coil.

The high-voltage winding is similar to the low-voltage winding, the subdivided conductors being connected in parallel at the ends of each coil and being transposed at the middle of each coil. The circuit of the high-voltage winding may be traced from the terminal 43, through the coil 23, the conductor 44, coil 24, conductor 45, coil 25, conductor 46, coil 26, conductor 47, coil 27, conductor 48, coil 28, conductor 49, coil 29, conductor 51 and coil 31, to the terminal 52.

In the forms of the invention illustrated in Figs. 5 and 6, the coils of the primary and secondary windings are interleaved in the same manner as illustrated in Fig. 4, that is, the coils of one winding are placed between the groups of coils of the other winding. The subdivided conductors in these windings are not, however, transposed in the middle of the coil as in Fig. 4, but the transposition is made between adjacent coils in Fig. 5 and between groups of coils in Fig. 6. In Fig. 5, for example, the parallel relation of the subdivided conductor strands is continued through two adjacent coils, the lower layer of strands of one coil being connected in series circuit with the upper layer of strands of an adjacent coil.

The circuit through the low-voltage winding in Fig. 5 may be traced from the terminal conductor 32, through the upper layer of subdivided conductors of coil 14 and by conductor 55 to the lower layer of subdivided conductors of coil 15, to the conductor 57, in parallel-circuit relation with the circuit, through the lower conductors of coil 14, the conductor 56, and the upper layer of subdivided conductors of the coil 15, to the conductor 57. The conductor 57 serves as a common conductor between the coils 15 and 16, at which point the circuit is again split through upper and lower subdivided conductors of the coil 16 and, by means of the conductors 58 and 59, respectively, to the lower and upper subdivided conductors of the coil 17 to the common conductor 61, thence, similarly, through the coils 18, conductors 62 and 63 in parallel, coil 19, the common conductor 64, coil 21, conductors 65 and 66, in parallel and coil 22, to the terminal conductor 42.

In Fig. 6, two parallel circuits extend between terminal conductors 32 and 42, one of which may be traced from the terminal conductor 32, through the upper strands of the coil 14, conductor 67, the upper strands of the coil 15, conductor 68, the upper strands of the coil 16, conductor 69, the upper strands of the coil 17, conductor 71, the upper strands of the coil 18, conductor 72, the upper strands of the coil 19, conductor 73, the upper strands of the coil 21, conductor 74 and the upper strands of the coil 22, to the conductor 42. The other parallel circuit extends from the conductor 32, through the coil 14, conductor 75, coil 15, conductor 76, coil 16, conductor 77, coil 17, conductor 78, coil 18, conductor 79, coil 19, conductor 81, coil 21, conductor 82, coil 22, to the terminal conductor 42, the circuit through each of the above-recited coils being through the lower layer of the subdivided conductors.

In the core structure of Figs. 4, 5 and 6, the main or effective magnetic flux passes through the several coils in the general direction of the winding leg 11 and back through the external portions 12 and 13 to complete the magnetic circuit, while the stray or leakage flux passes in the general direction of the planes of the windings between the middle leg 11 and one of the outer legs 12 or 13 without completing the magnetic circuit through the entire winding. This leakage flux causes a current to flow within the copper conductor in a plane at right angles to its path of travel, and which is decreased in accordance with the present invention by subdividing the conductor transversely to the axis of the winding by means of the insulation 3 between adjacent conductor elements. The subdivided conductor elements are positioned on opposite sides of this insulation or along a line at right angles to the plane of the coil. Since the dimension of the conductor at right angles to the direction of the leakage flux has been reduced, the eddy-current losses are materially reduced.

In order to insure that each subdivided conductor element carries a proportional part of the total current of the conductor, transpositions in the position of the conductor elements are made at convenient points with respect to the strength of the main flux through the winding.

In the form of the winding shown in Fig. 6, the upper layers of each coil are connected in series, and the lower layers of each coil are connected in series, the two circuits being connected in parallel-circuit relation to the terminal conductors 32 and 42. It will be noted that, in coils 14 and 15, each of the upper layers is further removed from the group of windings 23 to 26, inclusive, than are the lower layers of the conductors of these two coils, while, in the coils 16 and 17, the upper layers of each of the coils are nearer to the group of windings 23 to 26, inclusive, than are the lower layers. It is, therefore, apparent that the circuit through the four coils, 14, 15, 16 and 17, taken as a group, is such as to insure uniform distribution of current in the subdivided windings. A similar arrangement in the lower half of the winding effects uniform distribution of the current in the coils 18, 19, 21 and 22.

In the arrangement illustrated in Fig. 5, parallel circuits through the subdivided conductors are united after the circuits have passed through two adjacent coils, the transposition being made between these coils at a point where the leakage flux across the coils is substantially zero, thus insuring uniform distribution of current in each of the two coils having their subdivided elements connected in parallel, such two coils being taken as a unit.

In the arrangement shown in Fig. 4, the transposition is made in the middle point of each coil, so that each coil, taken as a unit, insures windings, as explained above. Since the high-voltage windings in each of Figs. 4, 5 and 6 are arranged similarly to the low-voltage windings of their respective figures, detail description thereof is deemed unnecessary.

Figure 8:
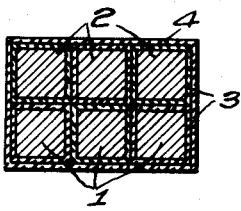

Fig. 8 illustrates a conductor made up of six strands or subdivisions, each separately taped with insulation 3 and combined into a single unit by means of the insulation taping 4. Fig. 3 illustrates a cross-sectional view of a winding made from such conductor. Each vertical pair of conductors may be transposed in the middle of the coil, thus giving a similar effect of that of the coil illustrated in Figs. 2 and 4.

Figure 9:
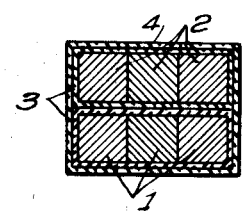
Figure 10:
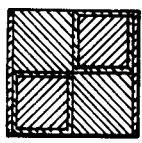
Figure 11:

Fig. 9 illustrates a conductor made up of six strands in which the lower three and upper three are taped together without insulation between the adjacent strands below or above the middle subdivision of the conductor. Fig. 10 shows an arrangement of the strands of the conductor in which two conductors are taped with insulation, and insulation is placed between adjacent conductors during the winding of the coil. Fig. 11 illustrates a conductor made up of two subdivisions which are interlinked or dove-tailed together with insulation between them and in which insulation is provided between adjacent turns of the conductor in the coil.

While the invention has been described as applied to rectangular coils, it may be applied equally well to circular coils or to any form of winding in which the leakage flux is parallel to the plane of the coils.

Since many modifications may be made in the circuits and apparatus illustrated without departing from the spirit of our invention, we do not wish to be limited otherwise than by the scope of the appended claims.

We claim as our invention:

1. An electrical winding comprising a plurality of coils each formed from a subdivided conductor having pairs of parallel-connected strands insulated from each other the strands of each pair being arranged along a path substantially at right angles to the path of the leakage magnetic flux caused by current flowing in said winding, said strands being connected in parallel and being transposed with respect to their relative positions in said magnetic path at a point approximately midway between their points of common connection.

2. In an electrical apparatus, a winding comprising a plurality of electrically connected coils assembled in groups, said coils being formed of parallel-connected strands insulated from each other and divided transversely of the axis of the coil, said strands being transposed longitudinally of the axis of the coil at a point midway between the points of their common connection.

3. In a transformer, a winding comprising a plurality of electrically connected coils connected in groups and a secondary winding separating said groups and also comprising a plurality of electrically connected coils, the coils of said windings comprising a conductor formed of parallel-connected strands subdivided transversely to the axis of said winding, said strands being connected in parallel-circuit relation and being transposed in a direction parallel to the axis of said winding at a point approximately midway between their points of common connection.

4. In a transformer, a primary and secondary winding comprising a plurality of interleaved coils connected in groups, the coils of each winding comprising a conductor formed of strands connected in parallel-circuit relation and divided transversely to the direction of the magnetic path created by said winding, the relative positions of said strands with respect to the coils of the other winding being transposed in a direction parallel to the axis of the coil at a point approximately midway between the points of their parallel connection.

In testimony whereof, we have hereunto subscribed our names this 7th day of December, 1929.

ROY L. BROWN.
WALTER M. DANN.
HORACE L. COLE.